United States Patent

Kornrumpf

[15] 3,697,716
[45] Oct. 10, 1972

[54] INDUCTION COOKING POWER CONVERTER WITH IMPROVED COIL POSITION

[72] Inventor: William P. Kornrumpf, Schenectady, N.Y.

[73] Assignee: General Electric Company

[22] Filed: Nov. 19, 1971

[21] Appl. No.: 200,530

[52] U.S. Cl. .........219/10.49, 219/10.77, 219/10.79, 321/DIG. 1
[51] Int. Cl. .............................................H05b 5/04
[58] Field of Search..219/10.49, 10.75, 10.77, 10.79; 321/DIG. 1; 318/114, 118

[56] References Cited

UNITED STATES PATENTS

| | | |
|---|---|---|
| 3,518,527 | 6/1970 | Russell..................321/DIG. 1 |
| 3,271,644 | 9/1966 | McShane..................318/118 |
| 3,256,417 | 6/1966 | Merrett..................219/10.79 |
| 2,338,236 | 1/1944 | Ferris..................219/10.79 X |

*Primary Examiner*—J. V. Truhe
*Assistant Examiner*—B. A. Reynolds
*Attorney*—John F. Ahern et al.

[57] ABSTRACT

In a solid state cooking appliance for inductively heating a cooking utensil, the static power converter has a d-c power supply energized by a single phase, three-wire source than enables the use of the distribution system neutral as a continuously grounded d-c terminal. The induction heating coil in an inverter operated at ultrasonic frequencies is positioned in the circuit with the outer turn connected directly to the grounded neutral. Capacitively coupled leakage current in the utensil is reduced.

11 Claims, 8 Drawing Figures

PATENTED OCT 10 1972 3,697,716

INDUCTION COOKING POWER CONVERTER WITH IMPROVED COIL POSITION

CROSS-REFERENCE TO RELATED APPLICATIONS

Induction cooking appliances with related power converter circuits are described and claimed in the following concurrently filed applications both assigned to the assignee of the present invention: Ser. No. 200,526 by David L. Bowers, Donald S. Heidtmann, and John D. Harnden, Jr.; and Ser. No. 200,424 by John D. Harnden, Jr. and William P. Kornrumpf.

BACKGROUND OF THE INVENTION

This invention relates to cooking appliances based on induction heating, and more particularly to solid state power converters for use in such appliances characterized by an optimum positioning of the induction heating coil in the circuit and an improved power supply.

Although known in principle for a number of years, the application of induction heating to the cooking of food was not competitive with the common gas range and electric range based on resistance heating until the development of solid state, ultrasonic frequency induction cooking appliances. These cool top appliances, as they are commonly known, comprise a static power converter typically formed by a rectifier and an inverter for generating an ultrasonic voltage wave that drives an induction heating coil. The alternating magnetic field produced by the induction heating coil is coupled through a cooking surface with the bottom of the cooking utensil, which acts as a single turn secondary winding.

A low cost, relatively simple inverter suitable for use in ultrasonic cooking equipment is a single-thyristor series resonant inverter utilizing the induction heating coil and a commutating capacitor as the basic oscillator circuit. The d-c power supply is energized by a commercially available single phase source and includes a conventional full wave diode bridge rectifier or phase controlled rectifier depending on whether a constant or variable inverter input voltage is desired. FIG. 8 of the latter cross-referenced application, Ser. No. 200,424, shows a preferred circuit arrangement in which the induction heating coil and commutating capacitor are connected across the thyristor and an inverse-parallel diode, with one plate of the commutating capacitor tied to the negative d-c supply terminal. The negative supply terminal, however, is an alternating ground since the operation of the full wave rectifier effectively involves switching the negative d-c terminal between the two input terminals. The present invention is directed to a more optimum arrangement of the induction heating coil made possible by the use of an improved d-c power supply.

SUMMARY OF THE INVENTION

The solid state cooking appliance to which the invention is applicable in its preferred form comprises a nominally flat induction heating coil that is mounted adjacent to a substantially unbroken, non-metallic utensil support and produces an alternating magnetic field for coupling power to a cooking utensil. A static power conversion circuit includes a d-c power supply and an inverter for generating an ultrasonic frequency wave that drives the induction heating coil. The d-c power supply has three input terminals suitable for use with a single phase, three-wire source of alternating voltage of the type usually provided for residential service. One input terminal is accordingly a continuous, solid grounded power distribution system neutral. The power supply includes full wave rectifying means drawing half wave power from each of the other input terminals and filter means for producing a desired unidirectional voltage between the grounded neutral terminal and a second output terminal. The inverter energized by the unidirectional voltage is preferably a series resonant inverter controlled by a single thyristor device that includes the induction heating coil as an integral component. The optimum position of the induction heating coil is that the large outer turn is directly connected to the grounded neutral terminal. This reduces the capacitively coupled leakage current in the cooking utensil. The optimum positioning of the thyristor device in the inverter is that it also is connected directly to the grounded neutral.

DESCRIPTION OF THE PREFERRED EMBODIMENTS

Figure 1:
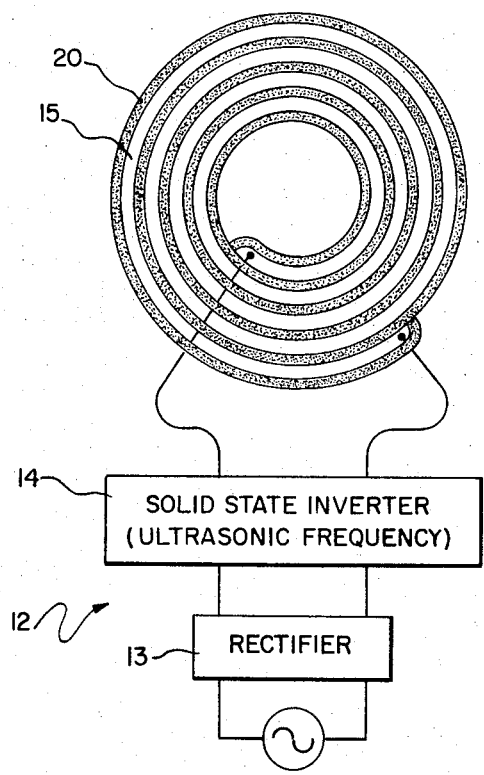
FIG. 1 is a block diagram of a static power converter for supplying ultrasonic frequency power to a flat spiral induction heating coil, shown in plan view, in a solid state induction cooking appliance.
Figure 2:
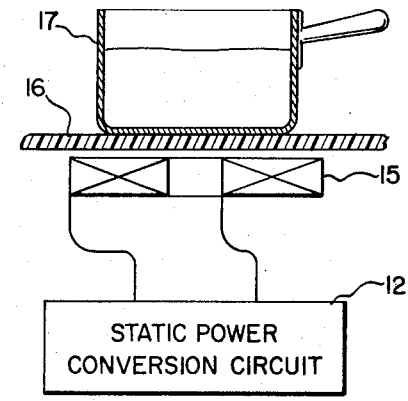
FIG. 2 is a diagrammatic cross-sectional view showing the relation of the induction heating coil to the utensil support and cooking utensil.

The induction cooking appliance shown in FIGS. 1–3 will be described with regard to an induction surface heating unit in an electric range, but essentially the same mechanical structure and electronic circuitry in higher and lower power versions is suitable for commercial cooking equipment and for a counter-top food cooking appliance. For the practice of the present invention, the static power conversion circuit indicated generally at 12 is preferably energized by a single phase commercially available 60 Hz, 120/240 volt source of alternating current potential. Static power converter 12 in general comprises a rectifier 13 and a solid state inverter 14 for converting the unidirectional rectifier output to an ultrasonic frequency voltage wave that drives the induction heating coil 15. Induction heating coil 15 is a single layer, annular, flat spiral, air-core or ferromagnetic-core coil wound with solid flat strip conductors or braided ribbon conductors. To generate sufficient magnetic flux to heat the utensil to the desired level, coil 15 is tightly wound with the short cross-sectional dimension of the conductors facing upwards and adjacent turns separated by a flat insulating strip 20.

In the cooking appliance (FIG. 2) induction heating coil 15 is appropriately mounted in a horizontal position immediately below a non-metallic or substantially non-metallic support 16 typically made of a thin sheet of glass or plastic. Non-metallic support 16 is commonly referred to as the cooking surface and supports the metallic cooking utensil 17 to be heated. Cooking utensil 17 is an ordinary cooking pot or pan, a frying pan, or some other available metallic utensil used in food preparation, and can be made of magnetic or non-magnetic materials. Special cooking utensils are not required although the best and most efficient results are obtained by optimizing the size, shape, and material of the utensil. Operation of static power converter 12 to impress an ultrasonic frequency voltage wave on induction heating coil 15 results in the generation of an alternating magnetic field. The magnetic flux is coupled across the air gap through non-metallic support 16 to utensil 17. At ultrasonic operating frequencies in the range of about 18 kHz to 30–40 kHz the cooking appliance is inaudible to most people.

Figure 3:
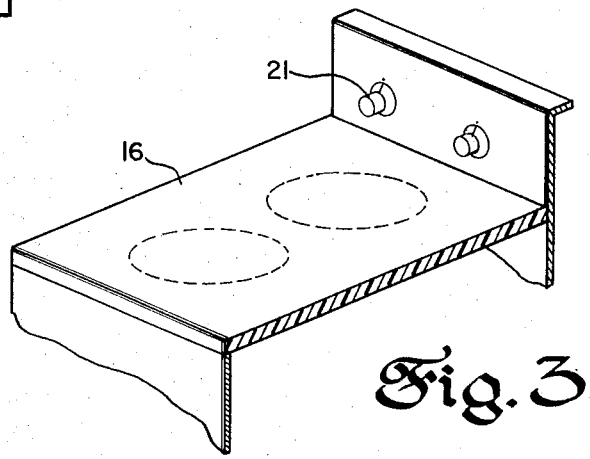
FIG. 3 is a fragmentary perspective view of an electric range with an induction cooktop unit as herein taught.

As shown in FIG. 3, an important feature of induction cooking equipment is the relatively smooth and substantially unbroken utensil supporting surface provided by support plate 16. At ultrasonic frequencies there are insignificant reaction forces which at lower frequencies would cause utensil 17 to move horizontally when placed on the cooktop surface approximately centered with respect to one of the induction surface unit positions indicated in dashed lines. Control knob 21 for each unit on the upstanding control panel of the range turns the individual unit on and off and sets the desired heating level or specific temperature to which the utensil is to be heated. Among the advantages of induction cooking are, briefly, that the surface of support 16 remains relatively cool; spilled foods do not burn and char, and hence both support 16 and utensil 17 are easy to clean; and the unobstructed utensil support is available for other food preparation and cooking tasks. The utensil is heated more uniformly than is the case with the conventional gas range or electric resistance heating range, and transfer of energy to utensil 17 is relatively efficient since heat for cooking is generated only in the utensil where it is wanted. Further, since this is a low thermal mass system and thus there is a relatively low storage of heat in the cooking utensil, the heating level or temperature to which the utensil is heated can be changed rapidly, as from boiling to simmering to warming levels.

Figure 4:
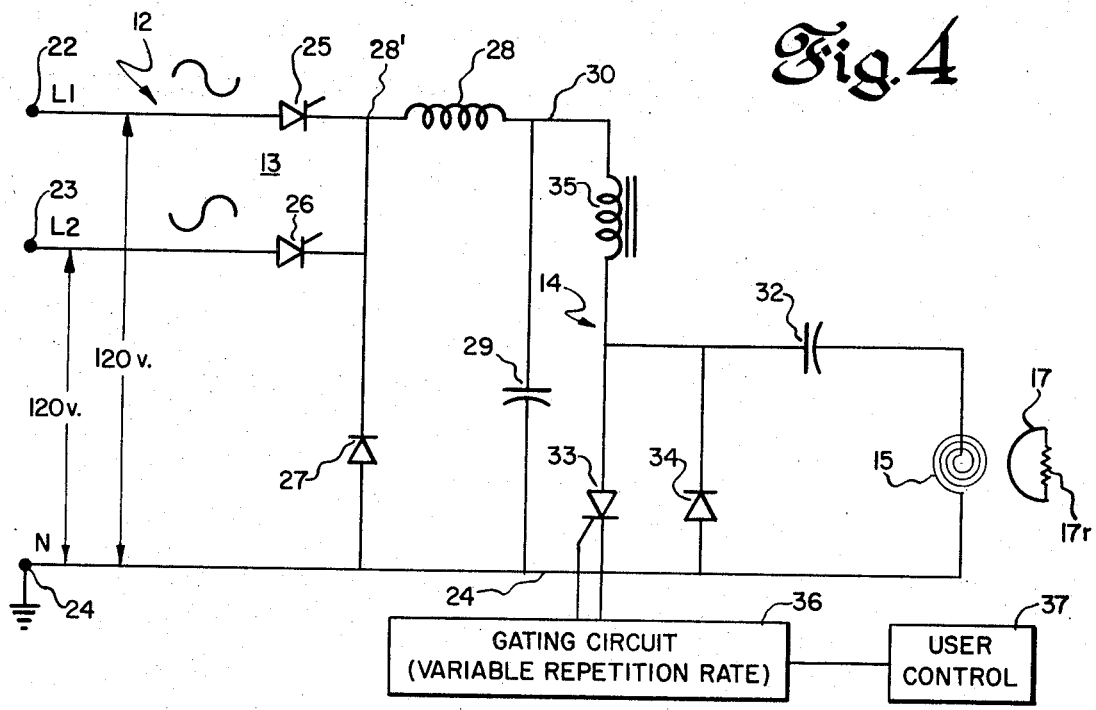
FIG. 4 is a detailed schematic circuit diagram of a static power converter constructed in accordance with a preferred embodiment of the invention.

The preferred embodiment of static power converter 12 shown in FIG. 4 is energized by the 60 Hz, 120/240 volt power distribution system almost universally provided for residential service. This is a single phase, three-wire service operating at 120 volts line-to-neutral and 240 volts line-to-line. The common electric range based on resistance heating is usually energized by the 240 volt line-to-line power. Thus, static power converter 12 has three input terminals 22, 23, and 24 respectively identified as the L1, L2, and N lines. Power distribution system neutral terminal 24 is normally grounded at the distribution panel of the residence and is hereafter referred to as the grounded neutral terminal. Rectifier 13 comprises essentially a pair of solid state power rectifier devices 25 and 26 which each draw half wave power from the two outside lines L1 and L2 of the three-wire source. The voltages between lines L1 and N and between lines L2 and N are equal in magnitude (120 volts) but 180° out of phase.

Rectifier 13 in FIG. 4 supplies a variable direct voltage to the inverter and for this reason is a phase controlled rectifier using unidirectional conducting thyristors as the solid state power rectifier devices 25 and 26. The anodes of thyristors 25 and 26 are respectively connected to input terminals 22 and 23, while the cathodes are tied together at the common input point 28' of a filter network comprising a series filter inductor 28 and a shunt filter capacitor 29. The d-c power supply is completed by a freewheeling diode 27 connected between grounded neutral terminal 24 and point 28'. Diode 27 facilitates line commutation of thyristors 25 and 26.

In the operation of this type of three input terminal d-c power supply, thyristors 25 and 26 are alternately rendered conductive at a selected phase angle of the complementary positive half cycles of the supply voltages appearing at input terminals 22 and 23. After the combined full wave rectified voltage is filtered by filter components 28 and 29, a variable unidirectional voltage is produced between positive output terminal 30 and grounded neutral terminal 24. Freewheeling diode 27 is rendered conductive by the voltage across filter inductor 28 to prevent the potential at point 28' from dropping below ground. Consequently, phase controlled thyristors 25 and 26 are commutated off at the end of the positive half cycle of their respective supply voltages by the line commutation mechanism.

It is seen that the full wave rectified voltage synthesized at point 28' is the same as would be produced by a conventional phase controlled bridge rectifier energized by a 120 volt, two-wire single phase a-c source. The present d-c power supply is advantageous in the context of the invention because the grounded neutral terminal 24, which is one of the input terminals for inverter 14, is a continuous "solid" ground. By comparison, the negative rectifier output terminal of a conventional bridge rectifier energized by the two-wire, single phase source is a discontinuous or alternating ground because the ground terminal is produced by alternate connections to the two input terminals. Thyristors 25 and 26 are preferably silicon controlled rectifiers but it is evident that a variety of other types of thyristors and solid state power devices can be substituted including power diodes if a constant d-c supply voltage is desired.

Solid state inverter 14 is a low cost, variable frequency one-thyristor series resonant inverter in which induction heating coil 15 has the dual function of providing the commutating inductance as well as coupling power to the utensil. The inverter is therefore relatively simple and requires only one firing circuit. Inverter 14 comprises a unidirectional conducting power thyristor 33 connected in series circuit relationship with a reset inductor 35 between input terminals 30 and 24. A diode 34 to conduct power current in the reverse direction is connected across the load terminals of thyristor 33. A series RC circuit is also usually connected across the load terminals of thyristor 33 for dv/dt protection to limit the rate of reapplication of forward voltage to the device. The basic power circuit is completed by a commutating capacitor 32 and induction heating coil 15 connected in series with one another and coupled directly across the terminals of the inverse-parallel combination of thyristor 33 and diode 34. This is the optimum arrangement and positioning of thyristor 33 and coil 15 in the circuit, with one terminal of each connected to grounded neutral terminal 24. Specifically, the outside turn of the induction heating coil is grounded to give the best results, although it is possible of course to connect the inner coil turn to ground. When either of the power devices is conducting, capacitor 32 and induction heating coil 15 form a series resonant circuit for generating damped sinusoidal current pulses that flow through induction heating coil 15. Reset inductor 35 functions to reset the commutating capacitor by charging commutating capacitor 32 positively during the non-conducting intervals of the thyristor-diode combination. Each cycle of current flow is initiated by a gating pulse applied to thyristor 33 by a variable repetition rate gating circuit 36. Suitable gating circuits that can be used are described in the previously mentioned Harnden and Kornrumpf application Ser. No. 200,424. A user control 37, for example, an adjustable potentiometer actuated by control knob 21 on the range control panel (FIG. 3), sets the repetition rate of gating circuit 36. Only a brief description of the operation will be given in view of the more extensive discussion in the foregoing application.

The inverter load is provided by the electrical losses in utensil 17. With respect to the utensil load, induction heating coil 15 functions as the primary winding of an air-core transformer. Utensil 17 functions as a single turn secondary winding with a series resistance 17r representing the resistive part of the I²R or eddy current losses, and hysteresis losses where applicable. The currents and voltages induced in utensil 17 when the induction surface unit is in operation are determined essentially by the transformer laws. The reflected utensil inductance forms a part of the total inductance of the high frequency resonant circuit of inverter 14.

Control of the power coupled to utensil 17, and therefore the heating level or temperature of the utensil, is achieved by changing the operating frequency or repetition rate of inverter 14. Lower power levels are obtained without operating at audible frequencies by reducing the input voltage. The ultrasonic operating frequencies of interest are about 18 kHz to 30–40 kHz. At the lower end of this range, 18 kHz is considered to be the upper limit of human hearing for most people. The upper end of the frequency range is determined largely by economic considerations, in conjunction with the high frequency limitations of available thyristor devices. The series resonant circuit comprising essentially commutating capacitor 32 and induction heating coil 15 is tuned to a resonant frequency that is higher than the highest desired operating frequency. It will be noted that under no-load conditions with utensil 17 removed from the induction surface unit, the total induction increases and there is therefore a change in the resonant frequency of the series resonant circuit. Turning on the induction surface unit applies d-c voltage to inverter 14 and conditions the high frequency resonant circuit for operation by charging commutating capacitor 32 positive as to the plate coupled to positive d-c input terminal 30 and negative as to the plate coupled to d-c terminal 24. The application of a gating pulse to thyristor 33 by main gating control circuit 36 causes it to turn on, energizing the series resonant circuit essentially comprising commutating capacitor 32 and induction heating coil 15. A damped sinusoidal current pulse flows through induction heating coil 15 and charges commutating capacitor 32 negatively. At this point the current in the series resonant circuit reverses and a damped sinusoidal current pulse of the opposite polarity flows through induction heating coil 15 and diode 34. During the time that feedback diode 34 is conducting, thyristor 33 is reverse biased by the voltage across diode 34 and turns off. When the current in the series resonant circuit again attempts to reverse, thyristor 33 does not conduct since it has regained its forward voltage blocking capabilities, and a gating pulse is not applied to the thyristor at this time. Because of the losses in the electrical circuit due to the heating of utensil 17, commutating capacitor 32 at the end of the complete conduction cycle on a steady state basis is left charged to a lower voltage than it had at the beginning of the oscillation.

Figure 5A:
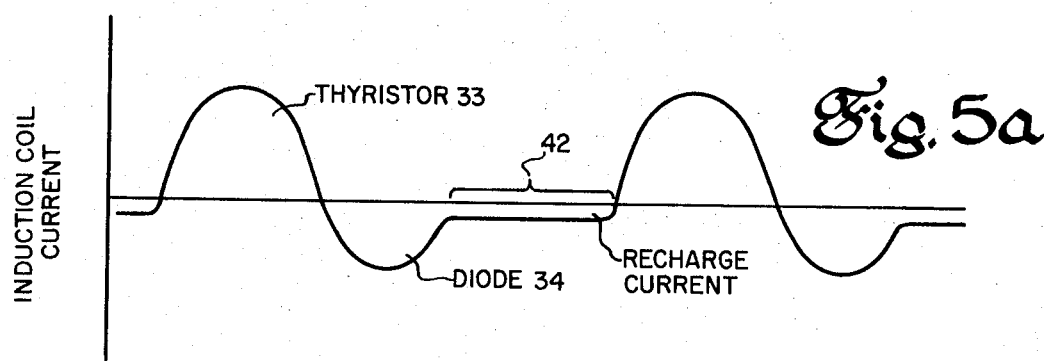
FIGS. 5a and 5b are waveform diagrams of the induction coil current and capacitor voltage for the FIG. 4 power converter.
Figure 5B:
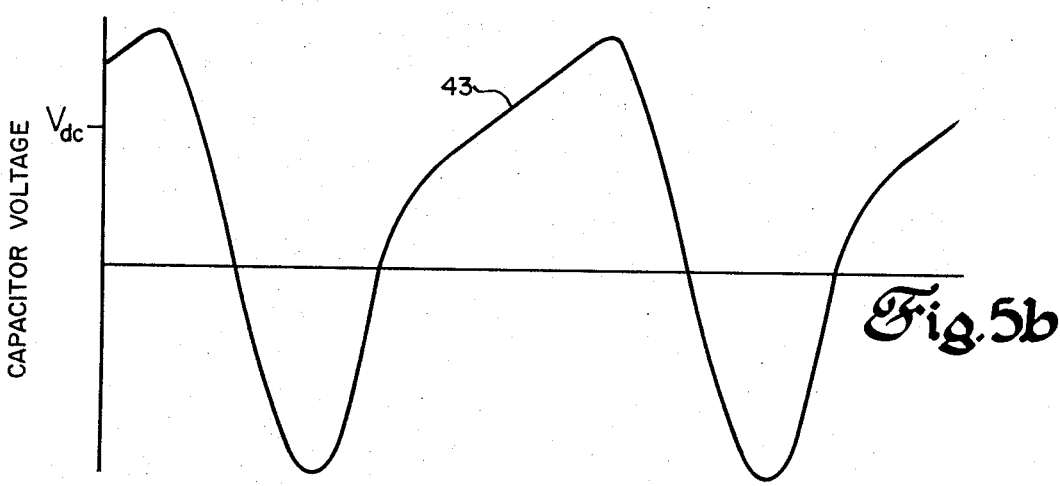

While either of main thyristor 33 and diode 34 are conducting reset inductor 35 is connected between the d-c supply terminals 30 and 24, and accordingly current builds up in inductor 35. During the circuit off-time when both of power devices 33 and 34 are non-conducting, the energy stored in reset inductor 35 is discharged and transferred primarily to commutating capacitor 32, thereby leaving commutating capacitor 32 with a net positive charge at the end of the circuit off-time or energy transfer period. FIG. 5a shows the sinusoidal induction coil current for two complete cycles of operation separated by a time delay interval 42 corresponding to the circuit off-time. The components of the coil current are labeled, including the small current circulating in coil 15 during the energy transfer period due to the recharge current of capacitor 32. The corresponding commutating capacitor voltage under steady state conditions with the utensil load in place is shown in FIG. 5b. At the end of the conduction cycle the magnitude of the positive voltage on capacitor 32 is lower than the magnitude of the peak negative voltage, and the action of reset inductor 35 during the interval 42 is to change the capacitor voltage almost linearly as indicated at 43, leaving the capacitor with a net positive charge at the end of interval 42. The function of reset inductor 35, then, is to replenish the high frequency system energy and sustain circuit oscillation. The amount of energy transferred to capacitor 32 depends on the magnitude of the current flowing in reset inductor 35 at the beginning of the energy transfer period and the time duration of the energy transfer period. The energy transfer period is terminated of course when main thyristor 33 is gated on again causing the high frequency inverter cycle to repeat. With practical component choices the circuit will transfer more energy from reset inductor 35 to commutating capacitor 32 as the transfer period is made shorter, relative to the high frequency oscillation period. That is, as the time interval 42 between complete conduction cycles becomes shorter, capacitor 32 is charged to a higher positive voltage during the circuit off-time, so that the magnitude of the capacitor voltage oscillations and of the sinusoidal current pulses increases. In summary, there are two effects that increase the power in watts supplied to utensil 17 when the inverter operating frequency or repetition rate is increased. There are larger and more frequently applied current pulses in induction heating coil 15. To obtain lower output power than is delivered at the lowest operating frequency, it is sometimes necessary to decrease the d-c input voltage. A useful power range is from 1 to 1.5 kilowatts to a lower limit of 100 watts or less in order to perform the common cooking requirements ranging from rapid heating to warming.

Figure 6:
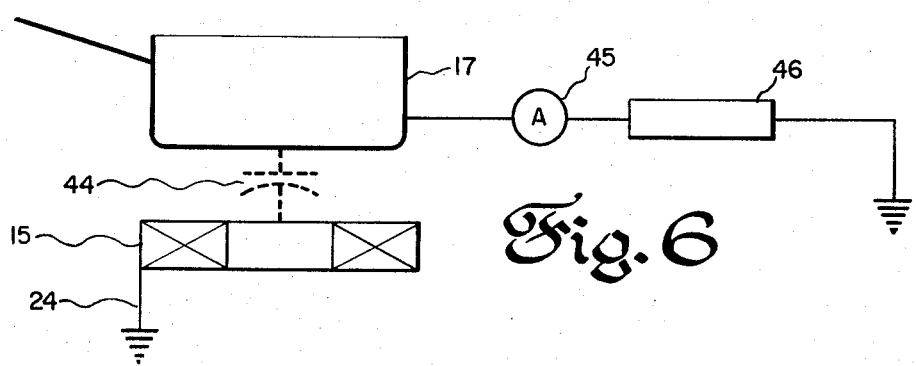
FIG. 6 is a schematic diagram illustrating the effective capacitance between the induction heating coil and cooking utensil, and further showing a circuit for measuring leakage current.

The benefit derived by using an inverter circuit arrangement in which induction heating coil 15 is directly connected to the power distribution system neutral terminal 24 is understood by reference to FIG. 6. There is an equivalent capacitance represented by the dashed line capacitor 44 produced between the flat coil 15 and the generally parallel bottom of utensil 17. Leakage current is generated in utensil 17 due to the presence of this equivalent capacitance. This capacitively coupled leakage current is measured by connecting an ammeter 45 and impedance 46 in series between the utensil and ground. The amount of leakage current can also be determined, if all factors are known, by the use of the fundamental capacitor equation relating current, voltage and capacitance commonly given as $i = C\, de/dt$. In this case, the applied voltage is approximately sinusoidal. As was previously mentioned, it is the large outside turn of coil 15 that is connected to grounded neutral terminal 24. With this coil arrangement, the value of the applied voltage in the capacitor equation is reduced with a consequent reduction in the leakage current. The extremely practical effect of providing a continuous ground of high integrity by using the power distribution system neutral, and positioning the induction heating coil in the inverter circuit to connect directly to the grounded neutral, is that there is less danger of electrical leakage current through the user to ground. Further, high frequency leakage is minimized since the high frequency system ground is common to the direct voltage ground.

Figure 7:
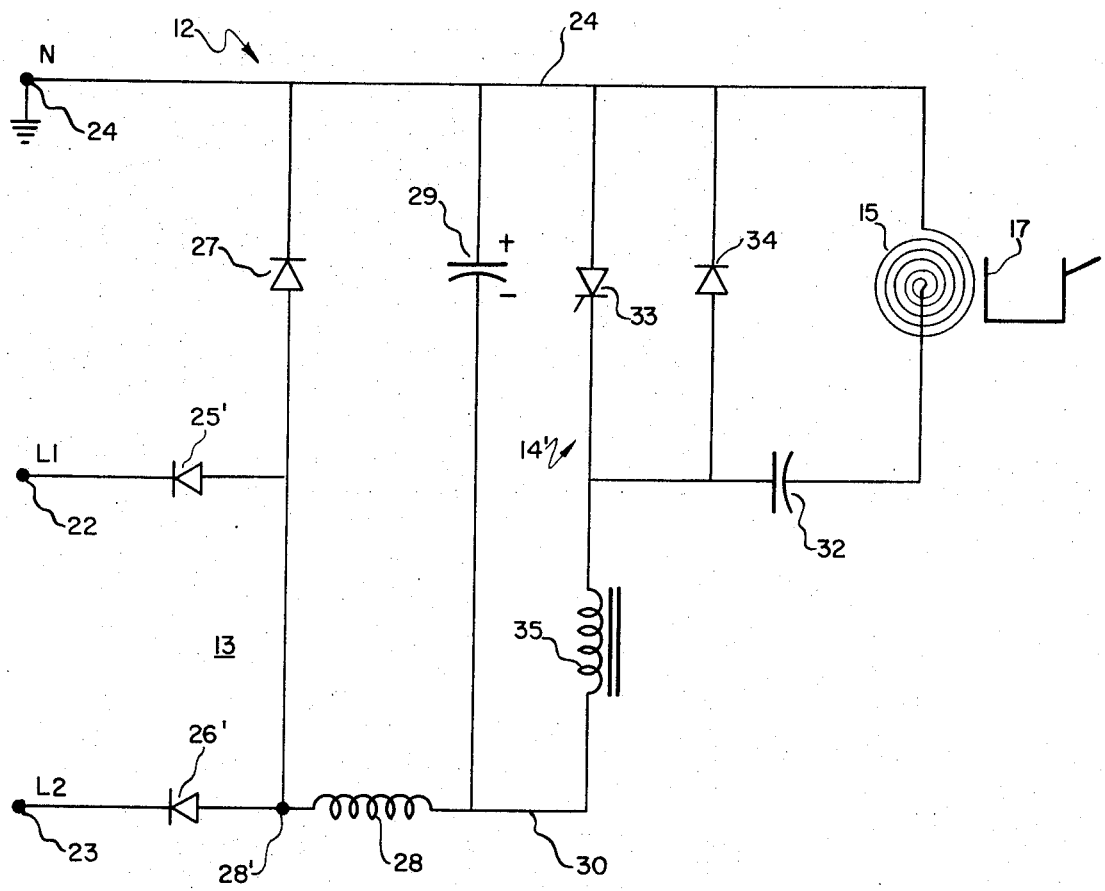
FIG. 7 is a schematic circuit diagram of a modification of FIG. 4 employing power diodes in the d-c power supply.

FIG. 7 is a modification of the FIG. 4 power converter illustrating the inverted circuit arrangement in which grounded neutral terminal 24 is the positive direct voltage supply terminal rather than the negative terminal as in FIG. 4. Power diodes 25' and 26' are substituted for thyristors 25 and 26 in the rectifier section of the d-c power supply. These diodes are connected with the opposite polarity and conduct during the complete negative half cycles of the complementary supply voltages. Consequently a constant d-c supply voltage for inverter 14' is provided between d-c supply terminals 24 and 30. In view of the foregoing description of the operation of the FIG. 4 circuit it is believed that the operation of FIG. 7 is evident. The inverted circuit arrangement is advantageous because its use avoids large amounts of direct current in the power distribution system.

In summary, an induction cooking appliance with a reduced level of capacitively coupled leakage current in the cooking utensil is produced by using a d-c power supply technique that permits the optimum positioning of the induction heating coil in the solid state inverter circuit. By using a full wave rectifier with a single phase, three-wire source enabling the use of the power distribution system neutral as a continuously grounded d-c terminal, one turn of the induction heating coil can be connected directly to the grounded neutral terminal.

While the invention has been particularly shown and described with reference to a preferred embodiment thereof, it will be understood by those skilled in the art that various changes in form and details may be made therein without departing from the spirit and scope of the invention.

What I claim as new and desire to secure by Letters Patent of the United States is:

1. An induction cooking appliance for use with a single phase, three-wire alternating voltage source comprising an induction heating coil mounted adjacent a utensil support and producing an alternating magnetic field for heating a cooking utensil, a solid state power supply having three input terminals including a grounded power distribution system neutral terminal, said power supply comprising full wave rectifying means and filter means for producing a desired unidirectional voltage between said grounded neutral terminal and a second output terminal, and a solid state inverter energized by said unidirectional voltage and generating an ultrasonic frequency wave that drives said induction heating coil, said induction heating coil being connected directly to said grounded neutral terminal.

2. A cooking appliance according to claim 1 wherein said induction heating coil is a nominally flat coil with the outer turn thereof connected to said grounded neutral terminal.

3. A cooking appliance according to claim 2 wherein said inverter is a series resonant inverter controlled by a single thyristor device, said thyristor device also being connected directly to said grounded neutral terminal.

4. A cooking appliance according to claim 1 wherein said full wave rectifying means comprises a pair of alternately conducting solid state rectifier devices respectively connected between the other two input terminals and a common input to said filter means.

5. A cooking appliance according to claim 1 wherein said full wave rectifying means comprises a pair of alternately conducting phase controlled thyristor devices respectively connected between the other two input terminals and a common input to said filter means, and a freewheeling diode connected between said grounded neutral terminal and said common input to said filter means.

6. A cooking appliance according to claim 1 wherein said full wave rectifying means comprises a pair of alternately conducting solid state rectifier devices respectively connected between the other two input terminals and a common input to said filter means, and a freewheeling diode connected between said grounded neutral terminal and said common input to said filter means, said inverter being a series resonant inverter controlled by a single thyristor device that is also connected directly to said grounded neutral terminal.

7. An induction cooking appliance for use with a single phase, three-wire alternating voltage source comprising
   a nominally flat induction heating coil mounted adjacent a substantially unbroken non-metallic utensil support and producing an alternating magnetic field for heating a cooking utensil,
   a solid state power supply having three input terminals including a grounded power distribution system neutral terminal, said power supply comprising full wave rectifying means and filter means for producing a desired unidirectional voltage between said grounded neutral terminal and a second output terminal, and
   a solid state inverter energized by said unidirectional voltage and generating an ultrasonic frequency wave that drives said induction heating coil,
   said inverter comprising a capacitor and said induction heating coil coupled together as a series resonant circuit that is operated by a single thyristor device, said induction heating coil and thyristor device being connected directly to said grounded neutral terminal.

8. A cooking appliance according to claim 7 wherein the outer turn of said induction heating coil is connected directly to said grounded neutral terminal, and
   said inverter is operated at a variable repetition rate and further includes a reversely poled diode connected across said thyristor device and reset inductor means for recharging said capacitor to sustain circuit oscillation.

9. A cooking appliance according to claim 7 wherein the outer turn of said induction heating coil is connected directly to said grounded neutral terminal, and
   said full wave rectifying means comprises a pair of alternately conducting solid state rectifier devices respectively connected between the other two input terminals and a common input to said filter means.

10. A cooking appliance according to claim 7 wherein the outer turn of said induction heating coil is connected directly to said grounded neutral terminal,
    said full wave rectifying means comprises a pair of alternately conducting phase controlled thyristors respectively connected between the other two input terminals and a common input to said filter means,
    said filter means comprises a series filter inductor and shunt filter capacitor, and
    said power supply further includes a freewheeling diode connected between the common input to said filter means and said grounded neutral terminal.

11. A cooking appliance according to claim 7 wherein the outer turn of said induction heating coil is connected directly to said grounded neutral terminal,
    said full wave rectifying means comprises a pair of alternately conducting power diodes respectively connected between the other two input terminals and a common input to said filter means,
    said filter means comprises a series filter inductor and shunt filter capacitor, and
    said power supply further includes a freewheeling diode connected between the common input to said filter means and said grounded neutral terminal.

* * * * *